United States Patent [19]

Yoshida

[11] Patent Number: 4,635,248

[45] Date of Patent: Jan. 6, 1987

[54] START-STOP SYNCHRONOUS DATA TRANSMISSION SYSTEM WITH A REDUCED REDUNDANCY

[75] Inventor: Tadahiro Yoshida, Kawasaki, Japan

[73] Assignee: Nitsuko Limited, Kawasaki, Japan

[21] Appl. No.: 700,294

[22] Filed: Feb. 11, 1985

[30] Foreign Application Priority Data

Feb. 9, 1984 [JP] Japan .................................. 59-20767

[51] Int. Cl.$^4$ ............................ H04L 5/24; H04J 3/00

[52] U.S. Cl. .......................................... 370/48; 370/99

[58] Field of Search .............. 370/99, 112, 100, 110.1, 370/48

[56] References Cited

U.S. PATENT DOCUMENTS 3,982,077 9/1976 Clark et al. ........................... 370/99
4,016,367 4/1977 Law et al. ............................. 370/99
4,479,213 10/1984 Galand et al. .................... 370/110.1
4,530,088 7/1985 Hamstra et al. .................. 370/110.1

*Primary Examiner*—Douglas W. Olms
*Assistant Examiner*—Frank M. Scutch, III
*Attorney, Agent, or Firm*—Roberts, Spiecens & Cohen

[57] ABSTRACT

Data signals in each channel over a plurality of sequential frames of a time division multiplex signal as received are temporarily stored in each channel memory, and are read out together from the channel memory at a given time to form a combined data signal. A start bit signal, a stop bit signal and an address signal corresponding to the channel are added to the combined data signal to form a start-stop synchronous fresh channel signal. The resultant N fresh channels are sequentially sent out to a common transmission line as a fresh time division multiplex signal with a reduced redundancy. A plurality of sub-equipments are connected to the common transmission line and take into the data signals of a channel assigned thereto according to the address data signal.

7 Claims, 5 Drawing Figures

11 CHANNEL SEPARATOR
10 TRANSMITTER
12-1 CHANL. MEMORY
12-N CHANL. MEMORY
13 CHANNEL SELECTOR
14 SIGNAL ADDER
16 SENDER
15 SIGNAL GENERAT.
17 TIMING CIRCUIT
40
30
21-1 RECEIV.
22-1 MEMORY
23-1 TIMING CIRCUIT
20-1, SUBSCRIBER
21-N RECEIV.
22-N MEMORY
23-N TIMING CIRCUIT
20-N, SUBSCRIBER

FIG. 1
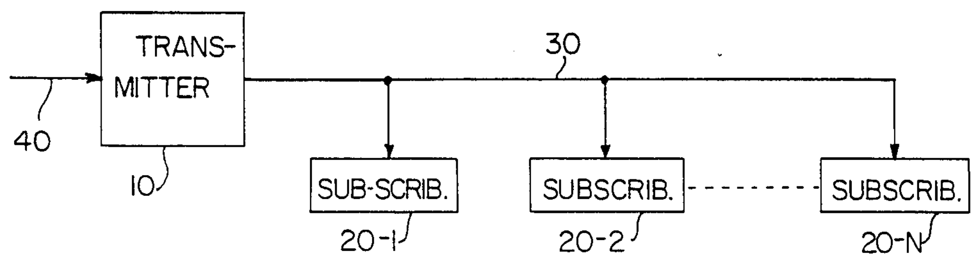
FIG. 2
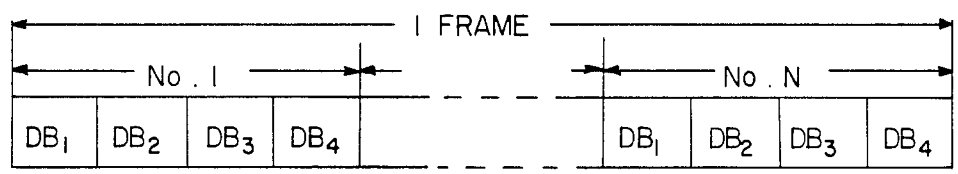
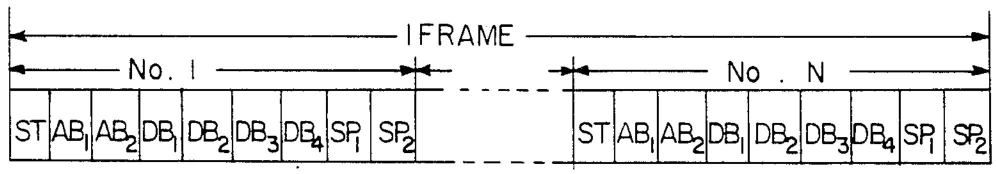
FIG. 3
PRIOR ART

START-STOP SYNCHRONOUS DATA TRANSMISSION SYSTEM WITH A REDUCED REDUNDANCY

BACKGROUND OF THE INVENTION

1. Field of the Invention

This invention relates to a start-stop synchronous data transmission system, and in particular, to such a system wherein a main equipment receives a time division multiplex signal from an external equipment through a common transmission line or a highway, and sends out the digital data signals of a plurality of channels in the multiplex signal to a single transmission line as the start-stop synchronous data signals to transmit the data signals to desired ones of a plurality of sub-equipment, respectively.

2. Description of the Prior Art

It is well known in the prior art to transmit a plurality of digital data signals from a main equipment to a plurality of sub-equipments, respectively, through a common transmission line according to the start-stop synchronous system. It is natural that an address data is added to each digital data signal as well as the start and stop bits.

Those digital data signals are produced within the main equipment in some systems, and they are supplied to the main equipment by a time division multiplex signal from an external equipment in another systems such as, for example, a digital private branch exchange (DPBX) system.

In a known DPBX system, the DPBX apparatus is provided with a transmitter which is connected to a plurality of subscribers through a common digital transmission line. Digital data signals of a plurality of channels are supplied to the transmitter as the time division multiplex signal through a highway in the DPBX. In the transmitter, the address data, the start bit and the stop bit are added to each digital data signal of each channel in each frame of the time division multiplex signal as received, and the resultant digital signal is sent out to the common digital transmission line as a time division multiplex signal. Each subscriber discriminates a channel signal addressed thereto according to the address data, and derives the digital data signal in the channel signal.

In the known DPBX system, the time division multiplex signal on the common digital transmission line is quite high in the redundancy because many redundant bits such as the address data and the start and the stop bits are added to every digital data in every channel.

SUMMARY OF THE INVENTION

An object of the present invention is to provide a start-stop synchronous time division multiplex transmission system wherein data signals in respective channel of a time division multiplex signal as received at a main equipment are transmitted to a plurality of sub-equipments corresponding to the respective channels together with start and stop bit signals and address data signals representing addresses of the sub-equipments through a common transmission line as a start-stop synchronous time division multiplex signal with a reduced redundancy.

According to the present invention, a plurality of (N) channels in each one frame of the time division multiplex signal as received in the main equipment are separated to one another at channel separating means and are provided to N output ports thereof. The N output ports are connected to N channel data signal storing means, respectively, so that the data signals of the N channels are stored in the N channel data signal storing means. Each channel data signal storing means reads out the channel data signals of a predetermined number (n, $n \geqq 2$) of sequential frames at a given time after the channel data of the n frames are stored therein. The read out signals are selected one after another by selection means and the selected signal is given to signal adding means.

Signal generation means is provided which generates the start bit signal, the stop bit signal and one of N different address data signals of the N sub-equipments to the signal adding means.

Signal adding means adds to the selected one of the read out signal the start and stop bit signals and the one address data signal to form a fresh channel signal. Thus, N fresh channel signals are provided from the signal adding means one after another in response to the selecting operation of the selection means. The N fresh channel signals are sequentially sent out to the common transmission line from a transmitting means as a fresh time division multiplex signal.

In order to control the reading-out operation of the N channel data signal storing means one after another, timing signal generating means are provided.

The timing signal generating means also generates timing signals for controlling the selection means, and the signal generation means.

Further objects, features and other aspects will be understood from the following detailed description of preferred embodiments referring to the accompanying drawings.

BRIEF DESCRIPTION OF THE DRAWINGS

FIG. 1 is a schematic block circuit diagram view illustrating a system to which the present invention is applied;

FIG. 2 is a schematic view of a frame of a time division multiplex signal applied to a main equipment of the system in FIG. 1;

FIG. 3 is a schematic view of a frame of another time division multiplex signal formed at the main equipment and transmitted to a common transmission line according to the prior art;

FIG. 6 is a view illustrating timings of various parts in the embodiment of FIG. 5.

DETAILED DESCRIPTION OF PREFERRED EMBODIMENTS

Figure 4:
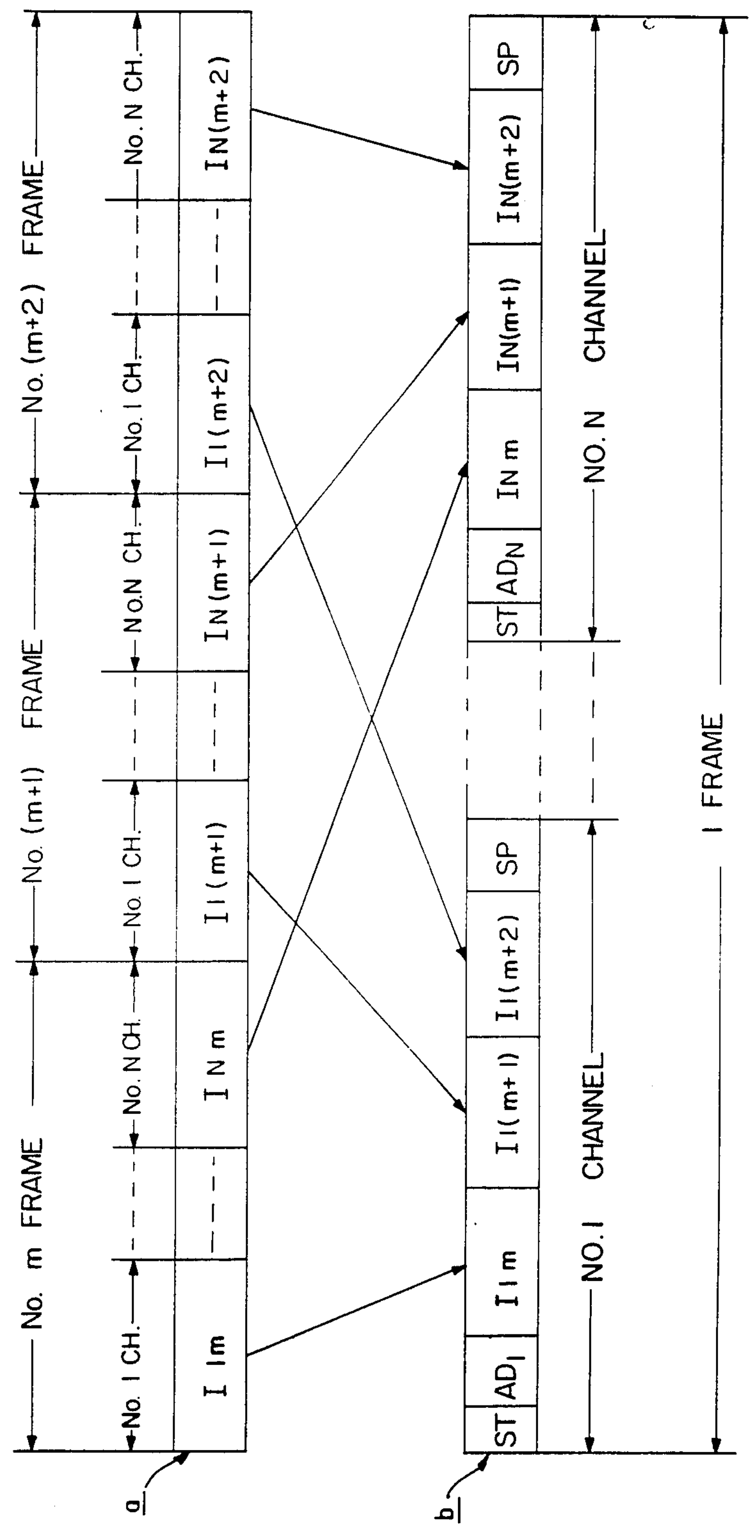
FIG. 4 is a schematic view of an example of a frame of a multiplex signal according to the present invention and illustrating a manner for preparing the frame from the data signal received at the main equipment.

Referring to FIG. 1, there is shown an example of a start-stop synchronous data transmission system to which the present invention is applicable.

The system comprises a main equipment 10 such as a transmitter in a DPBX apparatus, a plurality of (N) subscribers 20-1–20-N, and a common digital transmission line 30 for connecting transmitter 10 to all subscribers 20-1–20-N.

Transmitter 10 is connected to a highway 40 in the DPBX and receives therefrom digital data of N channels by a time division multiplex signal through highway 40.

In FIG. 2, a frame of the multiplex signal comprises the digital data signals of N channels Nos. 1–N.

The digital data signals of N channels are again sent out to the common transmission line 30 to be delivered to subscribers 20-1–20-N. At that time, if the digital data signals of the N channels are directly sent out, each subscriber cannot discriminate which channel is addressed. In the prior art, an address data is added to each channel signal so as to indicate that subscriber which the channel signal is addressed, before the channel signal is sent out to transmission line 30. Further, the start and the stop bits are added to each channel signal for employing the start-stop synchronous system. Thus, the resultant channel signal comprises the normal data given through highway 40, the address data, the start bit and the stop bit. FIG. 3 shows an example of a frame composed by the resultant channel signals. It is understood that each channel of the frame of FIG. 3 has increased bits in comparison with that of FIG. 2.

Providing that the normal data has 4 bits $DB_1$–$DB_4$, the address data having 2 bits $AD_1$ and $AD_2$ (this means N is 4 at maximum), the start bit being 1 bit, and the stop bits being 2 bits $SP_1$ and $SP_2$, each channel of FIG. 3 has more bits by 5 ($=2+1+2$) than each channel of FIG. 2. With respect to one frame, a difference number of bits in the frame in FIG. 2 and that of FIG. 3 is 20 ($=5\times4$) because $N=4$.

This means that the time division multiplex signal is sent out to the transmission line 30 with a quite high redundancy.

Furthermore, since a time duration of the frame (FIG. 3) sent out to transmission line 30 must be equal to that of the frame (FIG. 2) given through highway 40, each bit length in the frame of FIG. 3 is decreased in comparison with that in the frame of FIG. 2. This means that the transmission frequency on the transmission line 30 is relatively high.

According to the present invention, the multiplex signal can be sent out to the transmission line 30 with a reduced redundancy and a lowered transmission frequency.

Referring to FIG. 4, three frames No. m–No. (m+2) of the multiplex signal received at transmitter 10 is shown at a, and b shows one frame of a fresh multiplex signal sent out from transmitter 10 to the common transmission line 30.

Each frame of No. m–No. (m+2) of multiplex signal a comprises N channel's data signal $I_{1m}$–$I_{Nm}$–$I_{1(m+2)}$–$I_{N(m+2)}$.

In the transmitter, the data signal of each channel in No. m frame is combined with the data signals of the corresponding channel in the other two frames No. (m+1) and No. (m+2) to form fresh multiplex signal b, as shown by arrows in FIG. 4. That is, the data signal $I_{1m}$ of No. 1 channel in No. m frame is combined with the data signal $I_{1(m+1)}$ of No. 1 channel in No. (m+1) frame and the data signal $I_{1(m+2)}$ of No. 1 channel in No. (m+2) frame, so that the resultant data signal is $(I_{1m}+I_{1(m+1)}+I_{1(m+2)})$. In the similar way, with respect to No. N channel, data signals $I_{Nm}$, $I_{N(m+1)}$ and $I_{N(m+2)}$ in those three frames No. m–No. (m+2) are combined to form a resultant data signal $(I_{Nm}+I_{N(m+1)}+I_{N(m+2)})$. A start bit signal ST, a stop bit signal SP and different address data signals $AD_1$–$AD_N$ are added to the resultant data signals to form N fresh channel signals No. 1–No. N, as shown in FIG. 4.

Address data signals $AD_1$–$AD_N$ represent addresses of subscribers 20-1–20-N, respectively.

No. 1–No. 4 fresh channels are arranged one after another to form the one frame b of the fresh multiplex signal. The fresh multiplex signal is sent out to the common transmission line 30. The time duration of the one frame b is made to be equal to the total time duration of three frames a of the multiplex signal received at transmitter 10, by reducing time durations of data bits in frame b in comparison with those in frames a.

It will be understood that one frame b of the fresh multiplex signal is corresponding to three frames in FIG. 3 in the prior art because they have each channel data in three frames received at transmitter 10.

However, comparing one frame b of FIG. 4 and three frames according to FIG. 3, the former is clearly smaller than the latter in the number of the start bit signals, the stop bit signals, and the address data signals included therein. With respect to one channel, for example, No. 1 channel, only one start bit signal, only one stop bit signal and only one address are used in the former, but the same signals are used three times in the latter. Therefore, it will be understood that the multiplex signal according to the present invention is lower in the redundancy than that according to the prior art.

Figure 5:
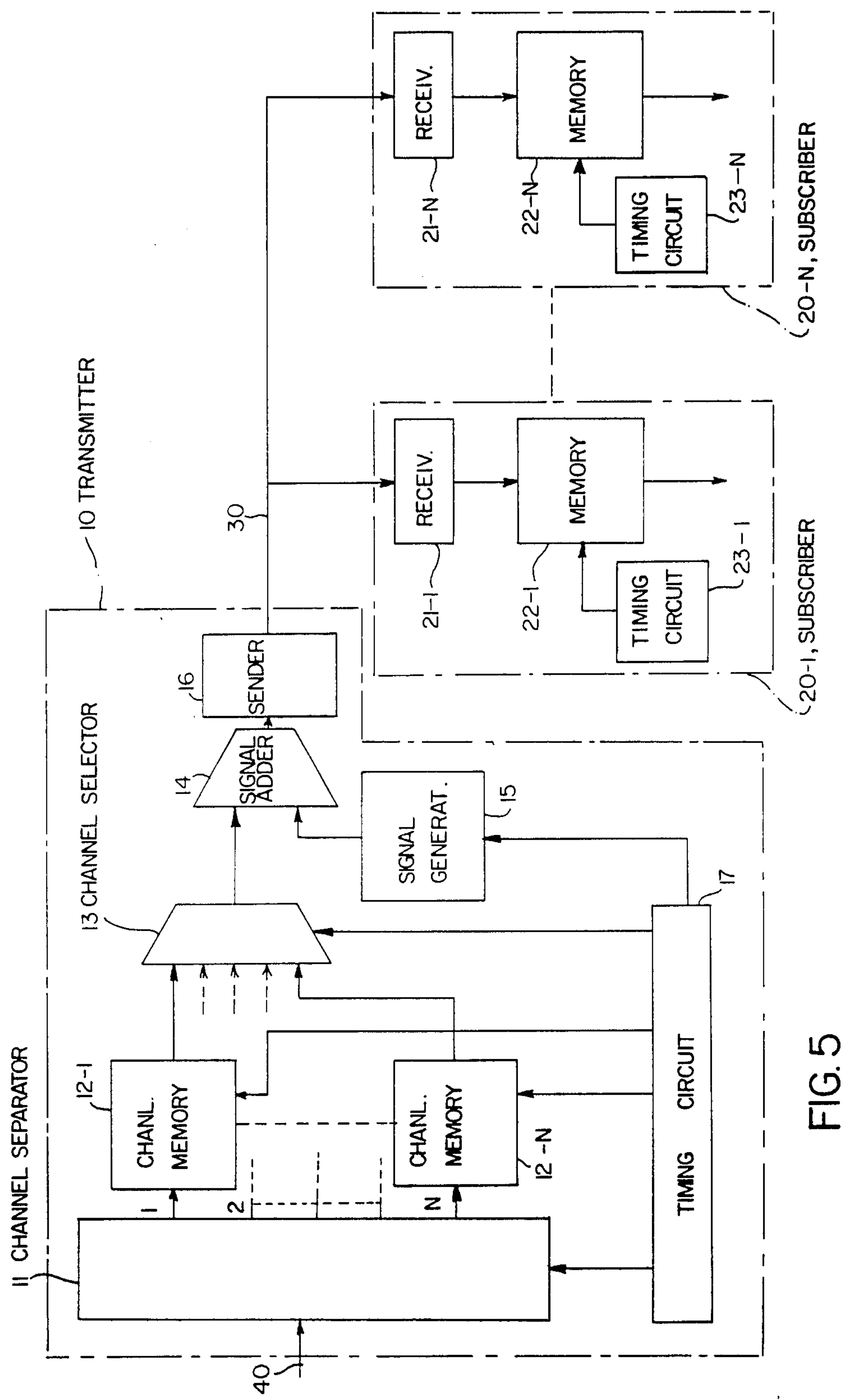
FIG. 5 is a schematic block circuit diagram of an embodiment of the present invention.

An embodiment of a transmitter forming such a low redundancy multiplex signal will be described referring to FIG. 5.

In the figure, the transmitter 10 comprises a channel separator 11, which separates N channels in each frame of the multiplex signal received at transmitter 10 from highway 40. The separated N channel signals are provided to N output ports 1–N, respectively. A known selection switch can be used as the channel separator 11, which selectively connects an input from highway 40 to the N outputs thereof one after another in synchronism with N channels in each frame of the multiplex signal from highway 40. When $N=4$, outputs on ports 1–4 are as shown in FIG. 6.

N channel memories 12-1–12-N are connected to the N output ports of channel selector 11. Accordingly, channel data signals of each one channel in sequential frames of the multiplex signal are stored in the corresponding one of N channel memories 12-1–12-N, sequentially. After channel data signals of a predetermined number of (n), for example, three in the embodiment, frames are stored in each one of channel memories 12-1–12-N, the channel memory reads out the stored channel data signals of the three frames. With respect to channel memory 12-1, after channel data signals $I_{1m}$, $I_{1(m+1)}$ and $I_{1(m+2)}$ are stored therein, $I_{1m}+I_{1(m+1)}+I_{1(m+2)}$ are read out. In the similar manner, channel memory 12-N provides a read-out signal $I_{Nm}+I_{N(m+1)}+I_{N(m+2)}$. Channel memories 12-1–12-N effect the reading-out operation at different times one after another, under control of reading-out timing signals from a timing circuit 17.

As each channel memories, random access memories (RAMs) or series registers can be used.

A channel selector 13 such as a selection switch is connected to outputs of N channel memories 12-1–12-N to select the read-out signals from channel memories 12-1–12-N one after another in synchronism with the reading-out operation of respective channel memories 12-1–12-N, under control of selection timing signals from timing circuit 17. The output of channel selector 13 is shown in FIG. 6.

Output signal of each channel from selector 13 is applied to a signal adder 14 to adding to the signal inputted thereto the start bit signal ST, the stop bit signal SP and the corresponding address data signal AD. Those start bit, stop bit and address data signals are provided from a signal generator 15. Those signals are shown in FIG. 6, at every channels Nos. 1–4.

As signal generator 15, a read only memory (ROM) can be used, which stores the start bit signal, the stop bit signal, and N address data signals corresponding to addresses of N subscribers 20-1–20-N. The stop bit signal, the start bit signal and one of N address data signals corresponding to the channel as selected by selector 13 are read out from ROM under control of timing signals from timing circuit 17 and are supplied to signal adder 14.

Accordingly, a fresh channel signal is outputted from signal adder 14, which comprises the start bit signal ST, the corresponding address data signal AD, the read-out and selected signal, for example, $I_{Nm}+I_{N(m+1)}+I_{N(m+2)}$, and the stop bit signal, as shown in FIG. 6.

Thus, No. 1–No. N fresh channel signals are sequentially outputted from signal adder 14, which forms one frame as shown at b in FIG. 4.

The N fresh channel signals are sent out to common transmission line 30 from a sender 16 as a fresh multiplex signal.

The multiplex signal is received at each subscriber of 20-1–20-N through common transmission line 30.

In each subscriber 20-1–20-N, a receiving circuit 21-1–21-N takes in the channel signal addressed to the subscriber according to the address data signal $AD_1$–$AD_N$, and provides the start and stop bit signals ST and SP in the taken-in channel signal to a timing circuit 23-1–23-N, while providing the data signal $(I_{1m}+I_{1(m+1)}+I_{1(m+2)})-(I_{Nm}+I_{N(m+1)}+I_{N(m+2)})$ to a memory 22-1–22-N such as series register.

The timing circuit 23-1–23-N generates timing pulses according to the start and stop bit signals, and read out the data signal stored in the memory 22-1–22-N. Thus, the read out data is used in the subscriber 20-1–20-N.

The arrangement of the subscriber is similar to that in the prior art except that the memory capacity of each memory of 22-1–22-N is three times of that in the prior art because three times data is transmitted by one frame of the multiplex signal on the common transmission line 30 in the present embodiment comparing with the prior art.

In the embodiment, although data signals of a channel in three sequential frames of the multiplex signal received at the transmitter are combined, the data signals can be combined over other desired plural number of frames.

What is claimed is:

1. A start-stop synchronous data transmission system wherein a main equipment receives a time division multiplex signal having data signals of a plurality of (N) channels in each frame thereof from an external equipment through a highway, and sends out N channel data signals together with start bit signals, stop bit signals and address data signals added thereto to a common transmission line as a fresh N channel time division multiplex signal so that said N channel data signals are delivered to N sub-equipments, respectively, which comprises:

channel separating means for separating said N channels in each one frame of said time division multiplex signal from one another and providing said N channel data signals at different N output ports, respectively;

N channel data signal storing means connected to said N output ports of said channel separating means, respectively, each channel data signal storing means storing channel data signals of the corresponding channel in sequential frames of said time division multiplex signal, and reading out the channel data signals of a predetermined number (n, $n \geqq 2$) of sequential frames at a given time after the channel data signals of said n frames are stored therein;

timing signal generating means coupled to said storing means and providing reading-out timing signals to said N channel data signal storing means, respectively, so that said N channel data signal effect the reading-out operation of said channel data signals in succession;

selection means for selecting the read-out signals from said N channel data signal storing means in succession;

signal generation means for generating the start bit signal, the stop bit signal, and N different address data signals representing addresses of said N sub-equipments, respectively;

signal adding means for adding to the one of said read-out signals selected by said selection means said start bit signal, said stop bit signal and a corresponding one of said N address data signals, so as to form a fresh channel signal consisting of said start bit, said corresponding address data signal, said n frame channel data signals, and said stop bit signal, whereby N fresh channel signals are provided from said signal adding means one after the other in response to the selecting operation of said selection means; and transmitting means for sending out said N fresh channel signals sequentailly onto said common transmission line as said fresh N channel time division multiplex signal.

2. The start-stop synchronous data transmission system as claimed in claim 1, wherein said timing signal generating means further generates another timing signal for controlling the selecting operation of said selection means to be synchronized with the reading-out operation of said N channel data signal storing means.

3. The start-stop synchronous data transmission system as claimed in claim 2, wherein said timing signal generating means further generates still another timing signal for controlling said signal generation means to provide the start bit signal, the stop bit signal, and the corresponding address data signal to said signal adding means in response to the selecting operation of said selection means.

4. The start-stop synchronous data transmission system as claimed in claim 1, wherein said channel separator is a selector switch.

5. The start-stop synchronous data transmission system as claimed in claim 4, wherein each of said N channel memories are formed by series registers.

6. The start-stop synchronous data transmission system as claimed in claim 5, wherein said selection means is a selector switch.

7. A method for preparing a first time division multiplex signal of a start-stop synchronous system from a given second time division multiplex signal having a plurality of (N) channel data signals in each one frame thereof by adding a start bit signal, a stop bit signal and an address data signal to each one of said N channel data signals, which comprises steps of:

separating N channel data signals in each one frame of said second time division multiplex signal from one another during the receiving of said second time division multiplex signal;

combining the separated channel data signals of the same channel in a predetermined number (n) of sequential frames of said second time division multiplex signal, to thereby form N channel composite data signals each comprising data signals of each one corresponding channel in said n sequential frames of said second time division multiplex signal;

adding to each of said N channel composite data signals the start bit signal, the stop bit signal, and the address data signal corresponding to the channel, to form N fresh channel signals; and arranging said N fresh channels one after the other to form a frame of said first time division multiplex signal.

* * * * *